United States Patent Office 3,445,185
Patented May 20, 1969

3,445,185
PREPARATION OF ALKALI METAL SULFATES
Heinz Scherzberg, Günter Döring and Wolfgang Ulrich, Sondershausen, Germany, assignors to Kali-Forschungsinstitut, Sondershausen, Germany
No Drawing. Filed July 26, 1966, Ser. No. 567,857
Int. Cl. C01d 5/00
U.S. Cl. 23—121                              1 Claim

ABSTRACT OF THE DISCLOSURE

Method of making alkali metal sulfate from calcium-sulfate by reacting the calcium sulfate with ammonium carbonate solution, thus obtaining calcium carbonate and ammonium sulfate solution, which is converted into alkali metal sulfate by addition of alkali metal chloride in the presence of an organic solvent, such as methanol, which dissolves ammonium chloride while precipitating alkali metal sulfate; regeneration of the ammonium carbonate from the ammonium chloride solution is effected after distillation of the solvent, by distillation with lime milk and carbonization of the escaping ammonia.

---

This invention relates to a method for making alkali metal sulfates from calcium sulfate.

The increasing demand for chlorine-free fertilizers and other sulfate containing alkali metal salts, make the use of new sulfate sources desirable. In addition to the already known sulfate-containing substances such as kieserite, epsom salt, and to sulfuric acid, an ample supply of cheap calcium sulfate is available for the said purpose in form of anhydrite or gypsum. However, due to the difficulty of dissolving anhydrite or gypsum, the reaction between the calcium sulfate and the alkali metal chloride will not yield alkali metal sulfate in a direct process. A process is known to force such a reaction by carrying out the conversion process in the presence of large quantities of ammonia, whereby, due to the formation of a complex salt the equilibrium is shifted to the alkali metal sulfate formation. However, technically this manufacturing method is rather difficult to perform, because the required concentration of the ammonia can only be achieved by applying high pressure or by cooling to very low temperatures which requires expensive machinery and renders the whole method uneconomical.

It is, therefore, an object of the invention to provide an economical method for making alkali metal sulfates from calcium sulfate.

It is another object of the invention to use calcium sulfate for making of alkali metal sulfates, because it is relatively inexpensive and available in large quantities.

In accordance with the invention the above mentioned objects will be achieved by converting, in a first step, gypsum or anhydrite in an aqueous solution of ammonium carbonate into calcium carbonate and ammonium sulfate. This is done by a method known per se.

After separating the precipitated calcium carbonate, the ammonium sulfate solution is mixed and stirred with a defined quantity of solid or dissolved potassium chloride and methanol. Thereby, the potassium sulfate formed is precipitated in an almost theoretical amount while a methanol-containing solution of ammonium chloride is formed. The aqueous ammonium chloride solution which is obtained after the methanol was separated by distillation may be worked up to give ammonium chloride or may be used for recovering ammonia which escapes when milk of lime is added. The regeneration of the required ammonium carbonate solution in accordance with the first operational step, is achieved by a carbonization of the ammonia solution.

The required calcium oxide is made by burning the calcium carbonate obtained in step one, or by burning of fresh pieces of limestone. The burning process simultaneously yields the carbon dioxide required for the carbonization of the ammonia solution. The calcium chloride solution which is obtained from the ammonia distillation process is free of rock salt, in contrast to the calcium chloride obtained in the soda industry, and may be processed to solid calcium chloride or to a concentrated calcium chloride solution.

In an analogous operating step pure anhydrous sodium sulfate may be separated by conversion of ammonium sulfate solution and mineral salt, or sodium chloride solution in the presence of methanol. Highest yields are also obtained in the case of making sodium sulfate. A further possibility consists in that a common precipitation may be performed of alkali metal chloride and magnesium chloride-containing natural or technical salt solutions and ammonium sulfate solution which are precipitated with methanol. In this process, Kalimagnesia, $K_2SO_4 \cdot MgSO_4$, or aphthitalite, $Na_2SO_4 3K_2SO_4$ is obtained.

The further processing to potassium sulfate may be carried out by known methods. In all employed variations of the process another water-miscible organic liquid or a mixture thereof, with methanol may be used as a precipitation agent, e.g. ethanol; also acetone and mixtures therewith.

In the following, the invention will be more fully described in an example, but it should be understood that this is given by way of illustration and not of limitation, and that many changes in details can be made without departing from the spirit of the invention.

Making of calcium carbonate from phosphoratic gypsum; 15 tons of moist phosphorus gypsum are reacted with 180 tons aqueous ammonium carbonate solution in a stirring vessel, whereby 280 tons of ammonium sulfate solution and 76 tons wet $CaCO_3$ sludge are obtained. The sludge is decanted with addition of water, dried in a fluidized bed and burnt. The washing liquid and the ammonium sulfate solution are combined and passed into a second system of stirring vessels, wherein it is mixed with 132 tons methanol and 86 tons KCl. Thereby, a complete conversion of potassium chloride into potassium sulfate takes place. The potassium sulfate is separated from the solution in a system consisting of a thickener, mash vessel, hydrocyclone and a centrifuge, and is washed with an ammonium sulfate solution which takes part in the precipitation process, and subsequently with a small amount of water, whereby the main quantity of adhering methanol is removed and returned into the process. The ammonium chloride-containing methanol solution is passed into a bubble tray column, whereby 132 tons methanol are recovered, while a hot aqueous solution of ammonium chloride leaves the sump of the column. After mixing with lime milk, the formed ammonia is distilled in a second separating column designed like a soda distillation column. The calcium chloride solution from the column sump is discarded. The ammonia gas is absorbed in an absorbing vessel arranged in series. The required ammonium carbonate solution for the first process step is recovered by carbonization. For this purpose the carbon dioxide-containing gases of the lime burning step are used.

While the above description discloses a preferred embodiment of our invention, our invention is by no means limited to the embodiments shown, but rather any limitation shall be so specified in the following claim.

What is claimed is:

1. In a method for making alkali metal sulfate from calcium sulfate, wherein calcium sulfate is reacted with aqueous ammonium carbonate solution to obtain calcium carbonate and aqueous ammonium sulfate solution and wherein the latter is reacted with alkali metal chloride to obtain alkali metal sulfate and ammonium chloride, the improvement which comprises reacting the ammonium sulfate solution with the alkali metal chloride in the presence of methanol, ethanol, acetone or a mixture of acetone with one of the other solvents, thereby causing the alkali metal sulfate to precipitate and ammonium chloride to remain in solution, separating the alkali metal sulfate from the solution and subjecting the latter to distillation for the elimination of the organic solvent thereafter recovering ammonia by addition of milk of lime and distillation, and carbonizing the ammonia for recovery of ammonium carbonate to be returned into the process.

References Cited

UNITED STATES PATENTS

| | | | |
|---|---|---|---|
| 2,902,341 | 9/1959 | Baniel et al. | 23—121 X |
| 1,886,045 | 11/1932 | Reich | 23—121 |
| 2,094,573 | 9/1937 | Jacobi | 23—121 |
| 2,242,507 | 5/1920 | Burg | 25—121 X |

FOREIGN PATENTS 255,042  6/1926  Great Britain.

OTHER REFERENCES

Perry: Chemical Engineer's Handbook, pp. 714–15, McGraw Hill, N.Y., 1950.

Mellor: Comprehensive Treatise on Inorganic and Theoretical Chemistry, vol. II, supplement III, p. 1858; Longmans Green & Co., N.Y. 1963.

OSCAR R. VERTIG, *Primary Examiner.*

G. O. PETERS, *Assistant Examiner.*